United States Patent [19]

Meisel, Jr.

[11] 4,227,748
[45] Oct. 14, 1980

[54] TRACK TENSIONING APPARATUS

[75] Inventor: Thomas C. Meisel, Jr., Peoria, Ill.

[73] Assignee: Caterpillar Tractor Co., Peoria, Ill.

[21] Appl. No.: 92,915

[22] Filed: Nov. 9, 1979

Related U.S. Application Data

[63] Continuation-in-part of Ser. No. 909,759, May 26, 1978, abandoned.

[51] Int. Cl.³ ............................................ B22D 55/30
[52] U.S. Cl. ...................................... 305/10; 305/32; 305/34
[58] Field of Search ................. 305/10, 21, 22, 31, 305/32, 34; 180/9.5, 9.52

[56] References Cited

U.S. PATENT DOCUMENTS

| | | | |
|---|---|---|---|
| 2,453,750 | 11/1948 | Kamlookhine | 305/31 |
| 2,537,745 | 1/1951 | Daniels | 305/31 X |
| 2,584,512 | 2/1952 | Strait | 305/22 X |
| 2,719,062 | 9/1955 | Arps | 305/32 UX |
| 2,998,998 | 9/1961 | Hyler et al. | 305/10 X |
| 3,101,977 | 8/1963 | Hyler et al. | |
| 3,182,741 | 5/1965 | Roach | |
| 3,310,127 | 3/1967 | Siber et al. | 305/10 |
| 3,375,944 | 4/1968 | Bexton | 305/10 X |
| 3,447,620 | 6/1969 | Schoonover | |
| 3,447,621 | 6/1969 | Schoonover | |
| 3,774,708 | 11/1973 | Purcell et al. | 305/10 |
| 3,841,424 | 10/1974 | Purcell et al. | 305/22 X |
| 3,910,649 | 10/1975 | Roskaft | 305/10 |
| 3,970,327 | 7/1976 | De Zelan | |
| 4,087,135 | 5/1978 | Unruh | 305/22 |
| 4,090,723 | 5/1978 | Hart | |
| 4,149,757 | 4/1979 | Meisel, Jr. | 305/10 |

FOREIGN PATENT DOCUMENTS

| | | |
|---|---|---|
| 611543 | 11/1948 | United Kingdom . |
| 838894 | 6/1960 | United Kingdom . |
| 372108 | 10/1973 | U.S.S.R. . |
| 491513 | 2/1976 | U.S.S.R. . |

*Primary Examiner*—David A. Scherbel
*Attorney, Agent, or Firm*—William B. Heming

[57] ABSTRACT

A continuous track assembly (12) has a frame (16) and a first element (18) pivotally connected to the frame (16). A second element (20) is pivotally connected to the first element (18). Each element (18,20) has a rotatable wheel (22,24) about both of which a track (30) is positioned. The wheel (22) of the first element (18) is rotated by power and driving apparatus (36,44) in an associated work vehicle (10) to drive the track (30). Tension in the track (30) is maintained at a preselected level by apparatus (50) which moves the second element (20) relative to the first element (18) to position the wheels (22,24) against the track (30). The wheels (22,24) are freely pivotally movable as a unit to enable the track assembly (12) to readily adapt to its environment and maximize tractive effort. Maintaining the desired track tension substantially overcomes problems associated with a track which is too loose or tight which can result in slipping or damage to the track assembly (12).

6 Claims, 1 Drawing Figure

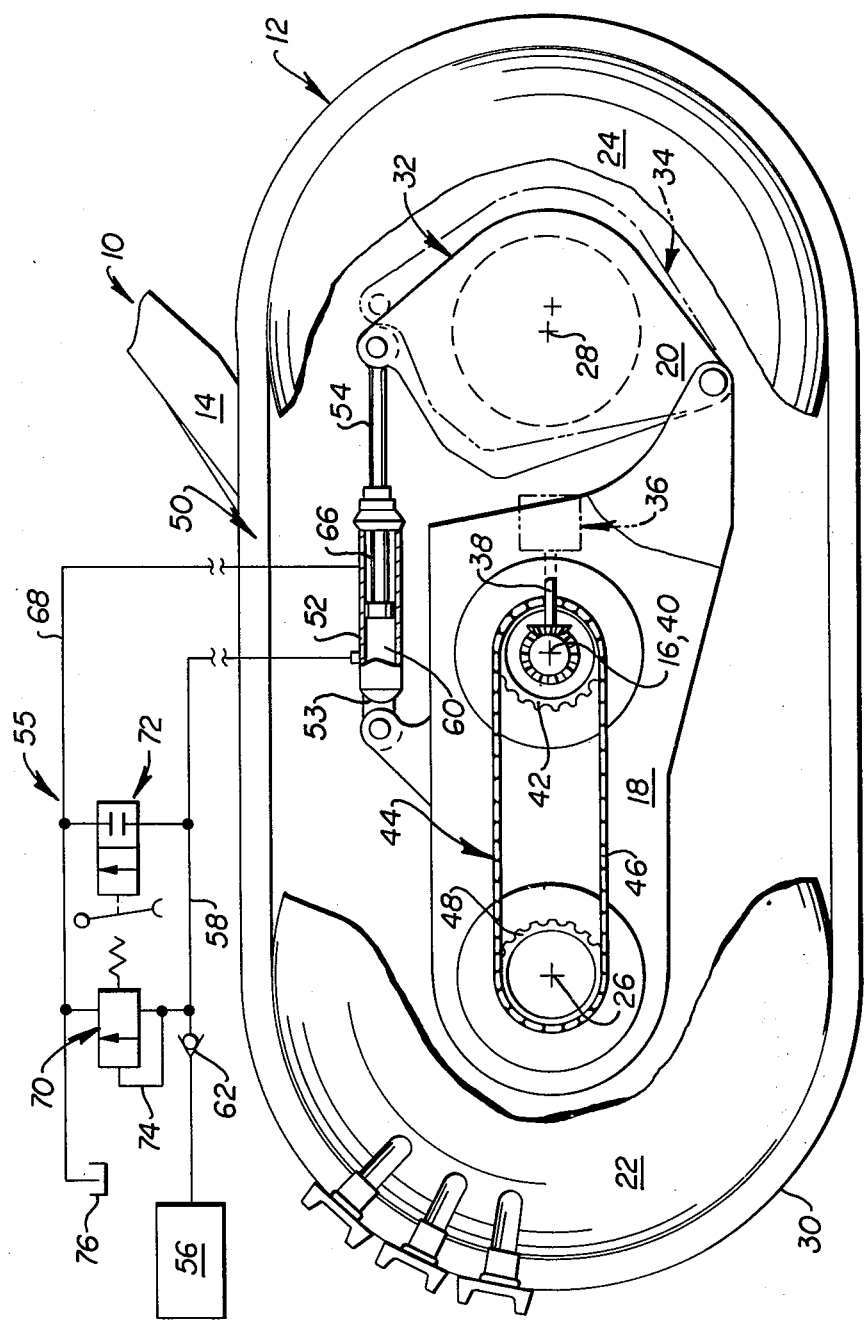

TRACK TENSIONING APPARATUS

CROSS REFERENCE TO RELATED APPLICATIONS

This application is a Continuation-in-Part of application Ser. No. 909,759 filed May 26, 1978, by Thomas C. Meisel, Jr., now abandoned.

DESCRIPTION

Technical field

The invention relates to apparatus for tensioning track positioned about wheels in a continuous track assembly. More particularly, the invention relates to first and second wheels associated with first and second elements which are pivotally movable to adjust track tension by changing position of the wheels.

BACKGROUND ART

In the use of a continuous track assembly, it is desirable to controllably position the wheels of the track assembly relative one to the other to properly maintain tension of the track about the wheels.

For example, a continuous track assembly is used on a work vehicle to provide increased traction. The track assembly generally includes wheels about which a track is positioned. It is desirable that the track conform to uneven terrain during operation of the vehicle and not penetrate the terrain surface. This provides maximum tractive effort and does not seriously disturb ground conditions.

Heretofore, track tensioning has been commonly maintained or adjusted by providing horizontal movement of one wheel relative to another wheel as is common on track-type tractors. Such track tensioning devices are shown, for example, in U.S. Pat. Nos. 4,149,757 which issued to T. C. Meisel, Jr. on Apr. 17, 1979, and U.S. Pat. No. 2,719,062 which issued to B. F. Arps on Sept. 27, 1955. Such track assemblies result in a generally rigid structure which resists the tendency of the track assembly components to adapt to the working environment. In vehicles operating over rough terrain, such as log skidders, the result can be a tractive effort or disturbance of the ground which is unacceptable for the particular working environment. Also, the operator typically must be more attentive to travel areas of the vehicle, which can limit its versatility.

In order to maximize adaptation of the vehicle to its environment to solve such problems, it can be desirable to allow wide pivotal movement of one or more of the wheels about which the track is positioned. However, it may therefore be necessary to permit pivotal movement of a wheel driven by a power source on the vehicle. More conventional track assemblies, such as in the above-described patents, typically do not provide this possibility. Also, the track assemblies disclosed in U.S. Pat. No. 4,087,135 which issued on May 2, 1978, to D. H. Unruh, U.S. Pat. No. 2,496,136 which issued on Jan. 31, 1950, to R. W. Smith, and British Pat. No. 611,543 issued to R. F. Skelton and published on Nov. 1, 1948, do not lend themselves to such pivotal action.

The present invention is directed to overcoming one or more of the problems as set forth above.

DISCLOSURE OF INVENTION

In one aspect of the present invention, a work vehicle has a frame and a first element connected to and pivotally movable relative to the frame. A second element is pivotally connected to the first element. Each of the first and second elements has a rotatable wheel about which a track is positioned. Power means is provided for rotating the first wheel for driving the track. Preselected tension in the track is maintained by means for controllably moving the second element relative to the first wheel.

In operation of the work vehicle, the wheels are pivotally movable together to adjust to changes in the terrain. Tension in the track is maintained through movement of the wheel associated with the second element inside of, and against, the track. This substantially overcomes problems associated with too much track tension experienced in going over a rock, for example, or under circumstances where track tension diminishes to an undesirable level.

BRIEF DESCRIPTION OF THE DRAWINGS

The drawing is a diagrammatic side view in partial cutaway of one embodiment of the present invention.

BEST MODE FOR CARRYING OUT THE INVENTION

Referring to the drawing, a work vehicle 10 has a continuous track assembly 12 and a frame 14. The frame has an axis 16 about which the continuous track assembly is oriented on the vehicle, as will be discussed. The continuous track assembly includes first and second elements 18,20 having first and second wheels 22,24, respectively, connected thereto. The wheels each have an axis 26,28 about which they are rotatable on their respective elements. A track 30 is positioned about and in contact with both the first and second wheels and has a tension relative to said wheels. As shown, said wheels are represented by tires, such as of the pneumatic type, which are enveloped by a flexible belt having individual shoes which represents the track. It should be understood that the wheels and track can be of other configurations as is known in the art without departing from the invention.

The first element 18 is connected to the frame 14 and pivotally movable relative to the frame about the axis 16 of the frame. The second element 20 is pivotally connected to the first element and pivotally movable relative to said first element about is pivotal connection thereto between first and second positions 32,34. As will be understood from the drawings, the first and second wheels are, as a result, movable one relative to the other and at said first position 32 of the second element, the axes 26,28 of said wheels are spaced a first preselected distance one from the other and at said second position 34 said axes are spaced a second preselected different distance one from the other. The distance between the axes is controllably determined to adjust or maintain tension in the track 30, as will be further explained.

Further provided on the work vehicle 10 is power means 36 for rotating the first wheel 22 for driving the track 30. The power means can be, for example, a hydraulic motor and bevel gear drive 38 as shown or any other source of rotational motion, such as a hydrostatic drive where a hydraulic motor placed at the first wheel and powered through lines entering the first element at the frame axis 16 directly drives the first wheel. The orientation of the gear drive results in an axis of rotation 40 of the power means substantially the same as or aligned with the axis 16 of the frame. A first sprocket 42 is also connected to the gear drive and rotatable about its axis in response to rotational output of the hydraulic motor. Driving means 44, shown as a chain 46, the first sprocket and a second sprocket 48, transfers the rotational motion initiated about the axis of rotation by the motor to the first wheel. The second sprocket 48 is connected to and rotates with the first wheel. The chain is positioned about and in engagement with both sprockets to transfer the rotational motion and drive the first wheel.

The work vehicle 10 also has means 50 for controllably moving the second element 20 relative to the first element 18 or wheel 22 for controllably maintaining a preselected tension in the track 30 relative to the wheels 22,24. In the embodiment shown, the track assembly 12 has a hydraulic cylinder 52 connected at a first end 53 to the first element and at a second end 54 to the second element. The cylinder, as a portion of the track tensioning means, can be used to adjust or maintain track tension in that it is positioned at a location sufficient for pivotally moving the first and second elements between their first and second positions 32,34.

The track tensioning means 50 also includes a hydraulic circuit 55 to control operation of the hydraulic cylinder. The circuit shown is of a configuration sufficient for automatically, controllably maintaining a preselected fluid pressure to the hydraulic cylinder in response to the amount of tension of the track 30 relative to the first and second wheels 22,24. The cylinder is connected by the circuit to a high pressure fluid source 56. The circuit consists of a supply line 58 connecting the fluid source to a first end fluid chamber 60 of the cylinder. A check valve 62 in the supply line 58 controls flow in a single direction from the fluid source to the cylinder. A second end fluid chamber 66 is connected to a return line 68. A relief valve 70 connects to the supply line between the check valve and the cylinder and to the return line. As is further shown, a two position dump valve 72 can be connected between the lines to exhaust fluid from the supply line and the first fluid chamber to a tank 74 for retracting the cylinder and collapsing the track.

Such circuit components and the hydraulic cylinder 52 are well known in the art. The track tensioning means 50 or circuit 54 can also be of other configurations as is known in the art. It should be understood that the track assembly 12 and particularly the first and second elements 18,20 and power and driving means 36 can be of other configurations as is known in the art without departing from the invention.

INDUSTRIAL APPLICABILITY

In initiating or maintaining desired tension in the track 30, the second element 20 is pivotally moved relative to the first element 18 to position the first wheel axis 26 a preselected distance from the second wheel axis 28. In this manner, the first and second wheels 22,24 are urged against the track 30 for the desired tension. Therefore, the tendency of the track under certain conditions to loosen and to slip or jump from the wheels, or to tighten and cause damage to the track assembly 12, is substantially overcome.

For example, on the work vehicle 10, the hydraulic motor and bevel gear drive 38 rotate the first wheel 22 through the chain drive mechanism 44. The driven wheel engages the track 30 to propel the vehicle 10. The track assembly 12 components tend to conform to the terrain during movement of the vehicle 10 owing to the first and second elements 18,20 moving pivotally as a unit in response to uneven terrain conditions. The track 30 also conforms to the terrain and to foreign objects located between the track and one of the wheels. Therefore, the pathway about the wheels 22,24 through which the track passes also changes. The result is a change in track tension relative to the wheels.

In making use of the hydraulic cylinder 52, track tension is controllably maintained by the hydraulic cylinder in response to relative movement of elements in the track assembly 12. Under typical conditions, fluid passes from the fluid source 56, through the supply line 58, and to the first end chamber 60. This tends to extend the cylinder and pivotally, outwardly move the first and second elements 18,20 relative to one another. Therefore, the outer surfaces of the wheels 22,24 continuously urge against the track 30 to create tension on the track. The tension is determined by the pressure of the fluid passing to the chamber 60 and by the relief valve 70.

If tension on the track 30 becomes too great, as when traveling over a rock, the track resists expansion and pressure builds in a pilot line 74 and overcomes biasing means 76, shown as a spring, at a preselected magnitude. This moves the relief valve 70 to the open position, fluid is exhausted through the return line 68 to the tank 76, and track tension becomes less as the second element 20 moves, for example, from the second position 34 toward the first position 32. In the above described manner, a constant preselected range of fluid pressure in the hydraulic circuit and predetermined expansion of the track relative to said pressure range serve to controllably maintain the tension of the track relative to the wheels 22 and 24.

It will be apparent, therefore, that the hydraulic circuit 55 and cylinder 52, in effect, automatically move the second element 20 relative to the first element 18 in response to a change in the preselected tension in the track 30 for automatically, controllably maintaining the preselected tension. Thus, the continuous track assembly 12 substantially prevents problems associated with track slippage relative to the wheels or with reduced traction. To increase traction, more tension can be created in the track by raising the pressure relief setting of the relief valve 70. Such action will not increase the power required to drive the track assembly 12 (up to, for example, bearing overload), but more power can be used.

Other aspects, objects and advantages will become apparent from a study of the specification, drawings and appended claims.

I claim:

1. A work vehicle (10) comprising:
a frame (14) having an axis (16);
a first element (18) having a first wheel (22) and being connected to said frame (14) and pivotally movable relative to said frame (14) about said axis (16) of said frame (14), said first wheel (22) having an axis (26) and being rotatable about said axis (26);
a second element (20) having a second wheel (24) and being pivotally connected to said first element (18), said second wheel (24) having an axis (28) and being rotatable about said axis (28), said second element (20) being pivotally movable relative to said first element (18) between a first position (32) at which said axis (26) of said first wheel (22) is spaced a first preselected distance from said axis (28) of said second wheel (24) and a second position (34) at which said axis (26) of said first wheel (22)

is spaced a second preselected distance from said axis (28) of said second wheel (24);

a track (30) positioned about and in contact with said first and second wheels (22,24) and having a preselected tension relative to said first and second wheels (22,24);

power means (36) for rotating said first wheel (22) for driving said track (30); and means (50) for controllably pivotably moving said second element (20) relative to said first wheel (24) for controllably maintaining a preselected tension in said track (30) relative to said first and second wheels (22,24).

2. The work vehicle (10), as set forth in claim 1, wherein said track tensioning means (50) includes a hydraulic cylinder (52) having first and second ends (53,54) and being connected at one of said ends (53,54) to said first element (18) and at the other of said ends (54,53) to said second element (20), said cylinder (52) being positioned at a location sufficient for pivotally moving said second element (20) between said first and second positions (32,34) of said second element (20).

3. The work vehicle (10), as set forth in claim 2, wherein said track tensioning means (50) includes a hydraulic circuit (55) of a configuration sufficient for automatically, controllably maintaining a preselected fluid pressure to said hydraulic cylinder (52) in response to the amount of tension of said track (30) relative to said first and second wheels (18,20).

4. The work vehicle (10), as set forth in claim 1, wherein said power means (36) has an axis of rotation (40) substantially the same as said axis (16) of said frame (14) and including driving means (44) for transferring rotational motion initiated about said axis of rotation (40) of said power means (36) to said first wheel (18).

5. The work vehicle (10), as set forth in claim 4, wherein said driving means (44) includes first and second sprockets (42,48) and a chain (46), said first and second sprockets (42,48) being rotatable in response to said power means (36) and connected to and rotatable with said first wheel (18), respectively, said chain (46) being engagingly positioned about said first and second sprockets (42,48).

6. The work vehicle (10), as set forth in claim 1, wherein said track tensioning means (50) automatically moves said second element (20) relative to said first element (18) in response to a change in said preselected tension of said track (30) for automatically, controllably maintaining said preselected tension in said track (30) relative to said first and second wheels (22,24).

* * * * *